US009054971B2

(12) United States Patent
Kumar et al.

(10) Patent No.: US 9,054,971 B2
(45) Date of Patent: Jun. 9, 2015

(54) POLICY MANAGEMENT OF MULTIPLE SECURITY DOMAINS

(75) Inventors: Apurva Kumar, Noida (IN); Sougata Mukherjea, New Delhi (IN); Venkatraman Ramakrishna, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 13/454,552

(22) Filed: Apr. 24, 2012

(65) Prior Publication Data

US 2013/0283338 A1    Oct. 24, 2013

(51) Int. Cl.
*H04L 29/06* (2006.01)
*H04L 12/24* (2006.01)

(52) U.S. Cl.
CPC ............ *H04L 41/0893* (2013.01); *H04L 63/20* (2013.01)

(58) Field of Classification Search
CPC ........................... H04L 63/20; H04L 41/0896
USPC ......................................................... 726/1, 10
See application file for complete search history.

(56) References Cited

U.S. PATENT DOCUMENTS

| | | | |
|---|---|---|---|
| 7,987,495 B2 | 7/2011 | Maler et al. | |
| 8,131,831 B1 * | 3/2012 | Hu | 709/223 |
| 2004/0187031 A1 * | 9/2004 | Liddle | 713/201 |
| 2006/0059539 A1 | 3/2006 | Shashikumar et al. | |
| 2006/0184490 A1 | 8/2006 | Heim et al. | |
| 2007/0266422 A1 | 11/2007 | Germano et al. | |
| 2008/0256593 A1 | 10/2008 | Vinberg et al. | |
| 2010/0064341 A1 | 3/2010 | Aldera | |

OTHER PUBLICATIONS

Buecker, Axel et al., "Flexible Policy Management for IT Security Services Using IBM Tivoli Security Policy Manager", An IBM Red paper Publication (Source: IBM_REDBOOKS) Form No. REDP-4512-00 published on URL: http://ip.com/redbook/REDP451200, Mar. 17, 2009, 32 pages.

Cheng, Vivying S. et al., "Enabling Web Services Policy Negotiation with Privacy preserved using XACML", Proceedings of the 40th Annual Hawaii International Conference on System Sciences (HICSS) 2007, Waikaloa, HI, USA, Jan. 2007, 10 pages.

De Coi, Juri L. et al., "A Flexible Policy-Driven Trust Negotiation Model", Proceedings of the 2007 IEEE/WIC/ACM International Conference on Intelligent Agent Technology, Silicon Valley, CA, Nov. 2007, pp. 450-453.

(Continued)

*Primary Examiner* — Brandon Hoffman
*Assistant Examiner* — Thong Truong
(74) *Attorney, Agent, or Firm* — Stephen R. Tkacs; Stephen J. Walder, Jr.; Parashos T. Kalaitzis

(57) ABSTRACT

A mechanism is provided in a data processing system for centralized policy management of multiple security domains in accordance with an illustrative embodiment. A policy enforcement point component in the data processing system receives an access request. The policy enforcement point component is managed by a plurality of security domains. The policy enforcement point component queries a policy broker component in the data processing system. The policy broker component determines an access decision that complies with policies of the plurality of security domains. It does so by orchestrating a workflow that involves the policy decision, administration, and information components of those domains. The policy broker component returns the access decision to the policy enforcement point component.

20 Claims, 4 Drawing Sheets

(56) References Cited

OTHER PUBLICATIONS

Haidar, Diala A. et al., "Access Negotiation within XACML Architecture", Proceedings of the Second Joint Conference on Security in Networks Architectures and Security of Information Systems (SARSSI), Annecy, France, Jun. 2007, 12 pages.

Keshariya, Mayank et al., "A Proposed Policy-Based Management Architecture for Wireless Clients Operating in a Heterogeneous Environment", Proceedings of the 8th Annual Information Security Management Conference, Edith Cowan University, Perth Western Australia, Nov. 30, 2010, 15 pages.

Ramakrishna, Venkatraman et al., "Distributed Policy Resolution Through Negotiation in Ubiquitous Computing Environments", Proceedings of IEEE PerCon 2009, Galveston, Tx, Mar. 2009, 10 pages.

Ramakrishna, V et al., "Negotiating Agreements Using Policies in Ubiquitous Computing Scenarios", Service-Oriented Computing and Applications, 2007. SOCA '07. IEEE International Conference on Jun. 19-20, 2007, 8 pages. URL: http://ieeexplore.ieee.org/xpl/freeabs_all.jsp?arnumber=4273425.

Westerinen, A et al., "Terminology for Policy-Based Management", http://www.ietf.org/rfc/rfc3198, Nov. 2001, 19 pages.

* cited by examiner

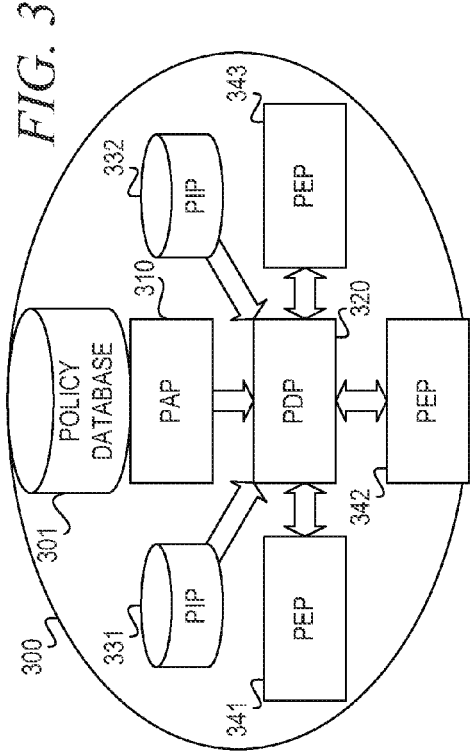
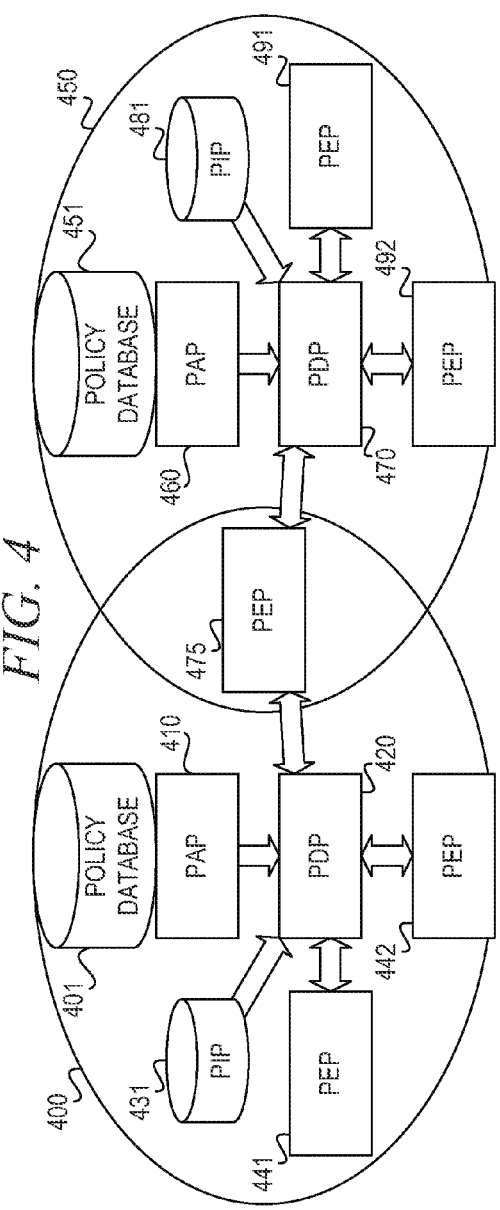

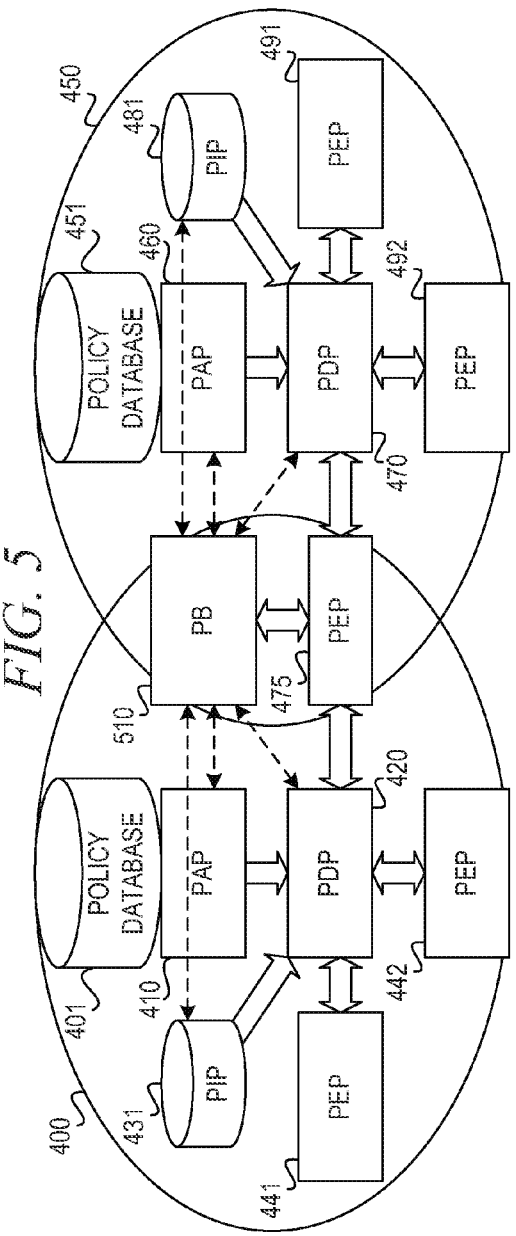
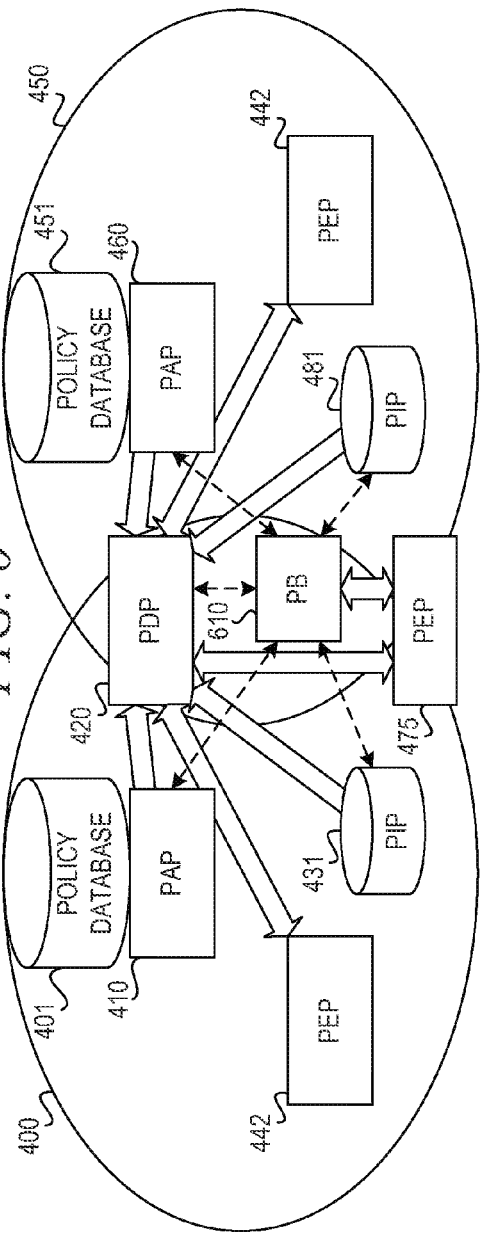
FIG. 5
FIG. 6

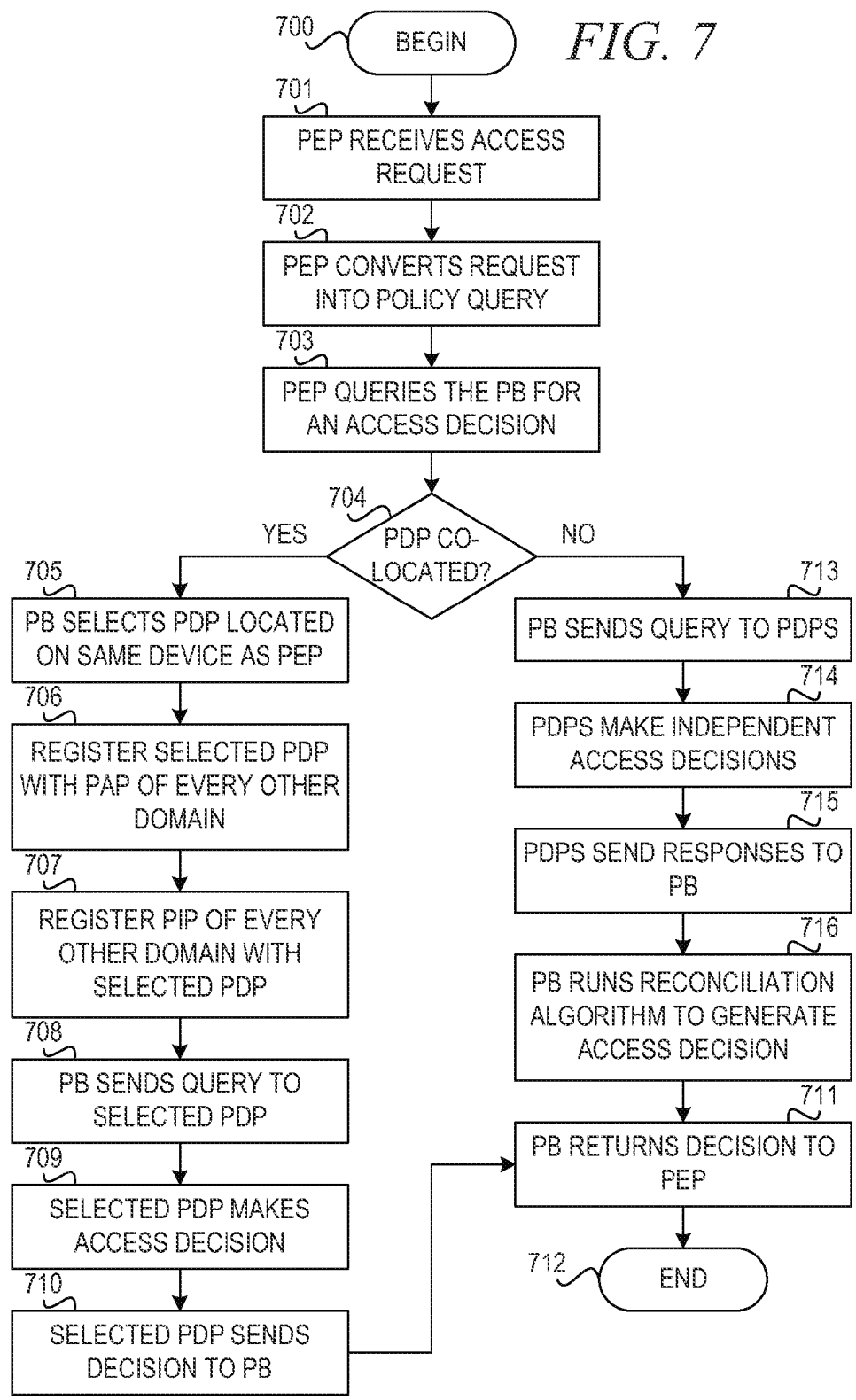

POLICY MANAGEMENT OF MULTIPLE SECURITY DOMAINS

BACKGROUND

The present application relates generally to an improved data processing apparatus and method and more specifically to mechanisms for policy management of multiple security domains.

A network security policy is a set of rules for computer network access. The policy determines how rules are enforced and lays out some of the basic architecture of the network security environment. A security policy may be very complex and may govern data access, web-browsing habits, use of passwords and encryption, email attachments, and so forth. A policy specifies these rules for individuals or groups of individuals throughout a domain, such as a company, a computer network, a social network, or the like.

A security policy should keep malicious users out and also exert control over potential risky users within a domain. A security policy should take into account what information and services are available (and to which users), what the potential is for damage, and whether any protection is already in place to prevent misuse, The policies may be expressed as a set of instructions that could be understood by software or special purpose hardware dedicated for securing the network.

Traditional centralized policy management architectures that have been employed to secure single domains and enterprises will not work in scenarios involving mobility, dynamic context changes, and merging of multiple domains. Where mobile devices may belong to multiple domains simultaneously and resources may be subject to the policy constraints of more than one domain, systems designers must ensure the correct policy is applied when an access control decision. must be made.

SUMMARY

In one illustrative embodiment, a method, in a data processing system, is provided for centralized policy management of multiple security domains in accordance with an illustrative embodiment. The method comprises receiving an access request at a policy enforcement point component M the data processing, system. The policy enforcement point component is managed by a plurality of security domains. The method further comprises querying, by the policy enforcement point component, a policy broker component in the data processing system. The method further comprises determining, by the policy broker component, an access decision that complies with policies of the plurality of security domains. The method further comprises returning, by the policy broker component, the access decision to the policy enforcement point component.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 illustrates centralized policy management architecture for single domain policy management in which aspects of the illustrative embodiments may be implemented;

FIG. 4 illustrates a multi-domain architecture in which aspects of the illustrative embodiments may be implemented;

FIG. 5 illustrates a multi-domain architecture with multiple policy decision points in accordance with an illustrative embodiment;

FIG. 6 illustrates a multi-domain architecture with a single policy decision point in accordance with an illustrative embodiment; and FIG. 7 is a flowchart illustrating operation of a mechanism for centralized policy management of multiple security domains in accordance with an illustrative embodiment.

DETAILED DESCRIPTION

Figure 1:
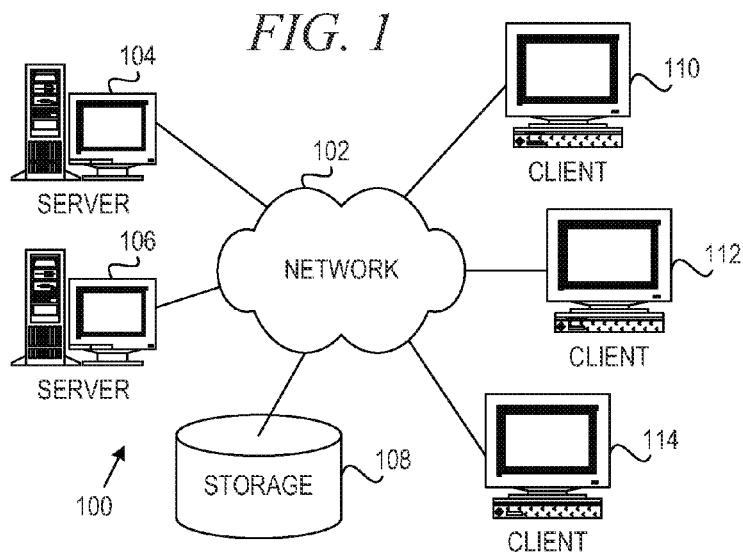
FIG. 1 depicts a pictorial representation of an example distributed data processing system in which aspects of the illustrative embodiments may be implemented.

The illustrative embodiments provide a mechanism for policy management of multiple security domains. In mobile and ubiquitous scenarios, multiple security domains may overlap. A large and ever growing class of applications today involves mobile devices primarily smartphones that not only allow their users to communicate with each other, but also provide online transaction services. A mobile device is also predominantly employed as a portal into a user's social network. Ad hoc interactions and transient associations are the norm. Resource accesses across the boundaries of security domains are commonplace. For a mobile device, context changes frequently; hence, designing applications while maintaining security and privacy is much more challenging in this mobile/ubiquitous computing world compared to the traditional static computing world. The most flexible and extensible way of maintaining security and policy constraints and controlling access to resources is by configuring and managing policies. The illustrative embodiments provide a policy management architecture that can handle multiple overlapping security domains and scenarios involving mobility.

In static or enterprise computing scenarios, the security domain is defined and the management is centralized. Change of domain boundaries typically involves manual action and validation. For unchanging domains within which a rigid chain of control can be maintained, policy based management provides the required level of safeguard against unauthorized access of resources by external entities. These frameworks are sensitive to changing internal contexts—though oblivious to external context—and memberships. The standard policy management architecture involves four classes of modules:

Policy Administration Point (PAP)—This module exists to enable the domain administrator to configure and update policy rules. (one per domain)

Policy Decision Point (PDP)—This module receives relevant policy rules from the PAP and returns decisions regarding access to guarded resources upon request. (one or more per domain)

Policy Enforcement Point (PEP)—This module guards a sensitive resource, receives access requests from third parties, and allows or rejects such access based on the PDP's decision. (one or more per domain)

Policy Information Point (PIP)—This stores relevant contextual information, typically in a Lightweight Directory Access Protocol (LDAP) directory, which can be queried by the PDP during its decision-making process. (zero or more per domain)

To handle policy management for multiple interacting domains, the above architecture may also include an optional Policy Negotiation Point (PNP) module. The role and function of the PNP are not standardized, unlike the other modules described above, and it can be adapted to suit a given application scenario. It has direct application to the mobile and ubiquitous computing scenarios of the kind described above. Managing trust and privacy in such scenarios and enabling distributed access to resources require mechanisms for dynamic negotiation. Some work has been done to incorporate the PNP into the architecture as a facilitator for a negotiation protocol between two domains. Negotiation, the nature of which varies with the application scenario, is a promising way of resolving domains' policies to ensure resources are accessed in an appropriate manner.

The centralized policy management architecture described above cannot support dynamic, mobile computing scenarios where security domains overlap. The architecture must be extended or modified to ensure security and privacy in ad hoc interactions. This is because mobile computing scenarios differ from static computing scenarios in the following ways:

1. Boundaries between domains are not as clear cut as in enterprise scenarios.

2. Members of one domain may not be exclusive members in all contexts. A mobile device may belong to multiple domain simultaneously; for example, a telecom operator's domain and a social network.

3. Access policies guarding sensitive resources may not be completely subject to the administration of a single domain. In a situation where one domain overlaps with another, an access decision must respect the policies of both domains.

There is no provision or recommendation in the classic policy management architecture to deal with multiple overlapping domains and to join and break the associations of two independent policy management spheres dynamically. One could manually broker such an arrangement, but that would not be an ideal solution.

Negotiation is applicable when two domains have nothing in common and have no mutual trust. A loosely coupled protocol allows the participating domains to keep their resources and policies as private as desired. Also, a negotiation is typically carried out in a sequence of steps; the number of steps can be arbitrarily large depending on the scenario. Furthermore, negotiation between two domains cannot be extended in a straightforward manner to negotiation among a larger number of domains.

The multi-domain interaction problem is not viewed in a holistic manner, thereby precluding an effort to find an architectural solution of the kind provided in the illustrative embodiments. The common assumption is that domains do not overlap and must always act independently, thereby leaving the nature of the interaction protocol to be customized to individual scenarios. The mechanisms of the illustrative embodiments described below involve a single decision-making step, although this process may take longer because of the extra information and policy rules that must be processed. The mechanisms of the illustrative embodiments also scale conceptually to an arbitrarily large set of domains, The illustrative embodiments extend the centralized policy management architecture for a single security domain to manage multiple overlapping domains with transient associations. The architectural changes are fully compatible with existing policy management designs and implementations. For a single domain, the model of the illustrative embodiments is idempotent with the legacy architecture.

The illustrative embodiments provide a policy management architecture for multiple overlapping security domains that uses the standard centralized policy management architecture administering a single domain as a building block. The architecture of the illustrative embodiments allows access to a resource protected by the multiple domains through a single shared gateway where policies mandated by the overlapping domains are enforced. A policy management module dynamically selects and facilitates an access control decision workflow that ensures compliance with the policies of the overlapping domains. The configuration of individual policy administration units determines this workflow. The illustrative embodiments provide a mechanism for collecting policy based access decisions from multiple domains and running a consensus or reconciliation algorithm to determine a final access decision, if none of the individual decision-making modules is present at the enforcement—or resource access—point. The illustrative embodiments provide dynamic configuration of a decision making module to obtain policies, contextual, and identity information from multiple overlapping domains, if such a decision-making module is already present at the enforcement—or resource access—point.

In accordance with the illustrative embodiments, mobile device users benefit and obtain value from a large class of interactive applications running partly on their devices. These applications allow them to interact with other users on the Web and perform transactions with third parties like online merchants. Mobile users can maintain multiple affiliations, both with static domains like telecom operators and diffuse domains like social networks, and have their security and privacy concerns met without having to take extra security measures on their devices that would involve technical knowledge. Mobile user preferences can be configured and maintained by the respective domains as policy rules.

In accordance with the illustrative embodiments, domain administrators only need to configure their individual policy management components and administer policy rules through their existing interfaces. Individual domains can remain independent of each other despite participating in collaborative scenarios. NO ad hoc manual arrangements between multiple domains are necessary in situations where they overlap. A wide range of mobile computing applications can be designed without having to devise a specific policy management solution for each application. The architecture of the illustrative embodiments may serve as a template for mobile computing applications.

In accordance with the illustrative embodiments, existing policy management tools may be reused and extended to support multi-domain policy management. The legacy software and configuration procedures will apply, and additional components may be created and configured. An additional policy broker component is implemented and optionally configured to handle multi-domain scenarios.

Figure 2:
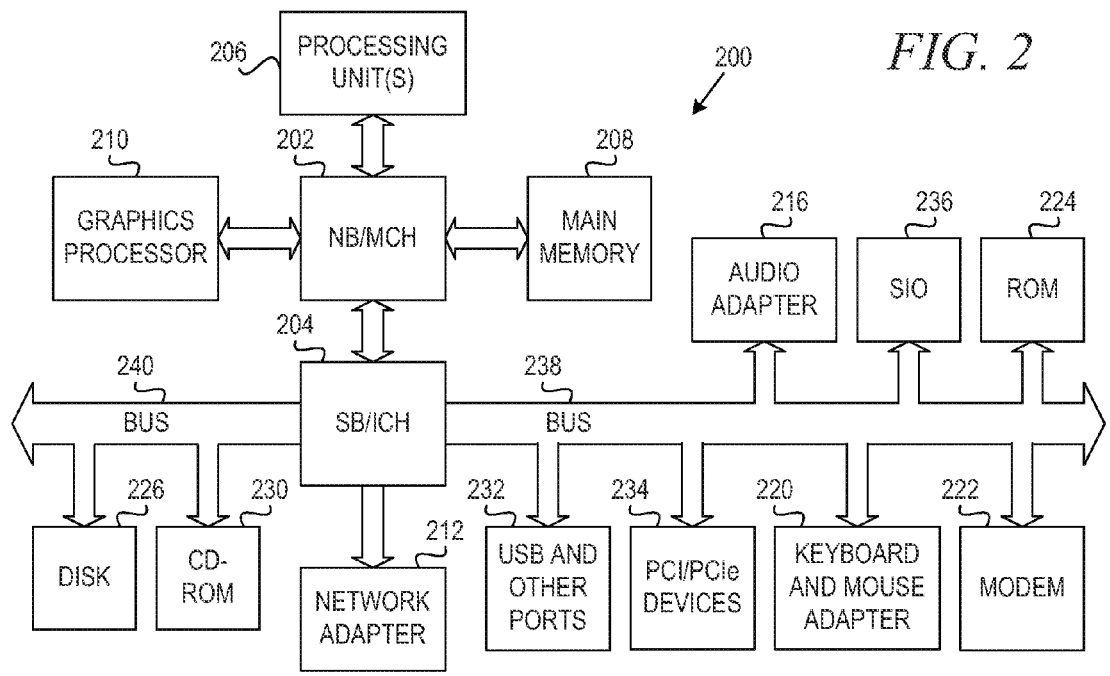
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like, As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX: operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG, 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. in some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates centralized policy management architecture for single domain policy management in which aspects of the illustrative embodiments may be implemented. In static or enterprise computing scenarios, management of security domain 300 involves policy database 301, which stores rules for managing access to resources in security domain 300, Policy administration point (PAP) component 310 enables the domain administrator to configure and update policy rules in policy database 301. Policy decision point (PDP) component 320 receives relevant policy rules from PAP component 310 and returns decisions regarding access to guarded resources upon request. Policy enforcement point (PEP) components 341, 342, 343 guard sensitive resources, receive access requests from third parties (clients), and allow or reject access based on a decision from PDP component 320. Policy information point (PIP) components 331, 332 store relevant contextual information, which can be queried by PDP component 320 during its decision making process. PIP components 331, 332 may store contextual information in a Lightweight Directory Access Protocol (LDAP) directory.

In mobile and ubiquitous computing scenarios, multiple domains may overlap. In accordance with an illustrative embodiment, each individual domain manages its policies using a variant of the architecture illustrated in FIG. 3. Any entity or domain that does not use policy management architecture may be treated as a black box from which access requests may be received and to which access decisions may be sent. Using this model, multiple domains intersect or share one or more policy enforcement points, FIG. 4 illustrates a multi-domain architecture in which aspects of the illustrative embodiments may be implemented. PAP component 410 enables the domain administrator to configure and update policy rules in policy database 401 for security domain 400. PDP component 420 receives relevant policy rules from PAP component 410 and returns decisions regarding access to guarded resources upon request. PEP components 441, 442 guard sensitive resources, receive access requests from third parties (clients), and allow or reject access based on a decision from PDP component 420. PIP component 431 stores relevant contextual information for security domain 400, which can be queried by PDP component 420 during its decision making process.

Similarly, PAP component 460 enables the domain administrator to configure and update policy rules in policy database 451 for security' domain 450. PDP component 470 receives relevant policy rules from PAP component 460 and returns decisions regarding access to guarded resources upon request. PEP components 491, 492 guard sensitive resources, receive access requests from third parties (clients), and allow or reject access based on a decision from PDP component 470. PIP component 481 stores relevant contextual information for security domain 450, which can be queried by PDP component 470 during its decision making process.

Security domain 400 and security' domain 450 overlap such that shared PEP component 475 is managed by both security domains. The illustrative embodiments ensure any access to resources governed by shared PEP component 475 must be subject to the policies of all intersecting domains and must use the information known collectively to all domains. According to the illustrative embodiments, the inherent properties and functions of each policy module should not be diminished, i.e., PEP components and PDP components must behave in a legacy manner, if desired. The architecture of the illustrative embodiments is backward compatible and idempotent with the architecture shown in FIG. 1 if the scenario consists of a single domain.

In the embodiments described herein, the architecture depicts a two-domain system to describe the invention and examples. The concepts can be extended in a straightforward manner for any n-domain system (where n>2).

As seen in FIG. 4, shared PEP component 475 has two PDP components it must consult before it can make the appropriate enforcement decision. In a first scenario, PDP component 420 and PDP component 470 are configured on different physical machines, neither of which hosts PEP component 475. PDP component 420 and PDP component 470 must be consulted independently in this case. This allows both domains to keep their policies and decision making process private.

In another scenario, at least one PDP component 420, 470 is configured on the same physical machine that hosts PEP component 475. As the PEP component 475 is shared between the domains, that machine is privy to the policies of both domains. Hence, one of the PDP components 420, 470 co-located with the PEP component 475 can be selected to make a. decision for both domains instead of both PDP components making independent decisions, which must be subsequently reconciled. This mechanism does not violate the privacy constraints of the domains.

The functions of PDP components 420, 470 remain unchanged. Determining the mode of operation and making the final enforcement decision requires more work on the part of the PEP component 475. To avoid changing the core nature of the PEP component, the illustrative embodiments provide a policy broker (PB) component. Every machine running a PEP component may optionally have a PB component configured to run on the machine.

The policy broker determines what category the given configuration falls under, i.e., whether multiple PDP components must be retained and consulted or a single PDP component can be chosen. The mechanism to determine the configuration is simple to implement, because the PDP-PEP and PB-PEP associations are known publicly within a domain.

FIG. 5 illustrates a multi-domain architecture with multiple policy decision points in accordance with an illustrative embodiment. In the depicted example, PEP component 475 formulates an access control query and sends the query to policy broker (PB) component 510. The PB component 510 sends the query to PDP component 420 in security domain 400 and PDP component 470 in security domain 450. Each PDP component 420, 470 makes a decision and responds to the PB component 510. The PB component 510 then runs a reconciliation algorithm on the set of collected decisions to generate a final decision. PB component 510 then relays the final decision to PEP component 475.

The architecture illustrated in FIG. 5 is agnostic to the nature of the reconciliation algorithm, and the algorithm is beyond the scope of this disclosure. In one example embodiment, PB component 510 may be configured to run a simple Boolean AND function by default, i.e., a conjunction of the decisions made to obtain the final decision. In an alternative embodiment, PB component 510 may be configured to determine a majority-based decision.

FIG. 6 illustrates a multi-domain architecture with a single policy decision point in accordance with an illustrative embodiment. In the depicted example, PDP component 420 is co-located on the same machine with PEP component 475 and PB component 610. PEP component 475 formulates an access control query and sends the query to PB component 610. The PB component 610 selects one PDP component, in this case PDP component 420, running on the same machine to be a common PDP component for both domains 400, 450. PDP component 420 then registers with the PAP 410 of domain 400 and the PAP 460 of domain 450, PIP component 431 in domain 400 and PIP component 481 in domain 450 register with PDP component 420.

PB component 610 relays the query of PEP component 475 to PDP component 420. The PDP component 420 makes a decision and responds to PB component 610. The PB component 610 returns the response to PEP component 475. PB component 610 plays a very small role in a single policy decision point scenario. If configured, PB component 610 is associated with a PEP component and simply acts as a request/response relay.

A system implemented using the architecture of FIG. 6 as a template would have access to its resources controlled by the appropriate policy, i.e., the collective policy of all the intersecting domains. As a practical matter, the multiple policy decision point mode may be more scalable than the single policy decision point mode, but the choice should be left to an individual system designer.

As an example of a real life scenario where multiple security domains overlap, consider a situation in which a user carries a mobile device that is subscribed to a telecom operator. The set of telecom subscribers is circumscribed and managed in a centralized manner by the operator and, hence, qualifies as a security domain. The user also maintains a social network and has ties to other social network users. The social network guards user identities and affiliations and, hence, qualifies as a security domain.

A disconnected mobile device belongs to no domain but its own. A connected mobile device belongs to the telecom domain and is subject to the policies of that domain. A connected mobile device that is logged into a social network is a member of both domains and is subject to the policies of both domains. it must be noted that some of the rules may be expressions of the user's preferences. The mobile device itself stores private information that a third party may wish to access, or the device may nm a service usable only by authorized entities. Therefore, the user's mobile device is a very appropriate location to run a policy enforcement point (PEP) component.

Distributed resource access mediated by a multi-domain policy management framework may be illustrated through a simple example. A mobile device user walks into a department store that sells clothes. The device is equipped with mechanisms to carry out online transactions, and one such transaction ensues with the merchant's server. After the user makes a purchase, the merchant's server sends electronic coupons that would be activated if the merchant is allowed to send advertisements to the user's social network contacts. In this context, an access request could be framed as follows:

Is it permissible to send SMS/USSD <message> to mobile device fall social network friends of <user>?

To reach the user's friends' mobile devices, both the social network's policy governing access to friends' names and identities (including mobile numbers) and the telecom's policy governing message passing to a subscriber's mobile phone must be complied with. The social network's policy rules governing information release are likely to involve both a user's willingness to expose his/her friends list and the friend's willingness to expose his/her private information. For example, <user> would likely offer permission in exchange for the promise of a merchant discount. The telecom's policies allowing message relays are likely to involve some form of payment and contextual information. For example, a second user, a telecom subscriber and social network friend of <user>, would not like to receive SMS or USSD messages between 12 pm and 3 pm on any day of the week.

Using the architecture of the illustrative embodiments, the user's device runs a PEP component and a PB component. Whenever the device is logged into the social network, the PB component discovers the social network and the telecom's PDP components. Depending on what mode is applicable and how it has been configured, one or more PDP components are selected to act as decision points. Assuming a PDP component is located on the device, which is likely to be the case for a social network PDP, the PDP component can be selected and registered to the telecom's PAP component. At the same time, the telecom's PIP components are also registered with the PDP component to provide extra contextual information. The access decision request is then send to the PDP component, which can now make a decision to allow a message to be sent, using the policy information of both domains. The PEP component appropriately allows or rejects the merchant's request. If the user's mobile device signs out of the social network, the cross-domain PAP and PIP registrations are terminated by the PB component.

As will be appreciated by one skilled in the art, the present invention Wray be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 7 is a flowchart illustrating operation of a mechanism for centralized policy management of multiple security domains in accordance with an illustrative embodiment. Operation begins at block 700, and a policy enforcement point (PEP) receives an access request (block 701). The PEP converts the request into a policy query (block 702). The PEP queries the policy broker (PB) for an access decision (block 703).

The PB determines whether a policy decision point (PDP) is co-located with the PEP on the same physical device (block 704). If a PDP is co-located with the PEP in block 704, the PB selects a PDP located on the same physical device as the PEP (block 705). The selected PDP registers with the policy administration point (PAP) of every other domain that shares the PEP (block 706). The policy information point (PIP) of every other domain that shares the PEP registers with the selected PDP (block 707). The PB sends the query to the selected PDP (block 708). The selected PDP makes an access decision (block 709) and sends the decision to the PB (Block 710). Thereafter the PB returns the decision to the PEP (block 711), and operation ends at block 712.

If a PDP is not co-located with the PEP on the same physical device in block 704, the PB sends the query to PDPs of every domain that shares the PEP (block 713). The PDPs make independent access decisions (block 714) and return their decisions to the PB (block 715), The PB runs a reconciliation algorithm to generate a reconciled access decision (block 716). Thereafter the PB returns the decision to the PEP (block 711), and operation ends at block 712.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for policy management of multiple security domains. The illustrative embodiments extend the centralized policy management architecture for a single security domain to manage multiple overlapping domains with transient associations. The architectural changes are fully compatible with existing policy management designs and implementations. For a single domain, the model of the illustrative embodiments is idempotent with the legacy architecture. The illustrative embodiments provide a mechanism for collecting policy based access decisions from multiple domains and running a consensus or reconciliation algorithm to determine a final access decision, if none of the individual decision-making modules is present at the enforcement—or resource access—point. The illustrative embodiments provide dynamic configuration of a decision making module to obtain policies, contextual, and identity information from multiple overlapping domains, if such a decision-making module is already present at the enforcement—or resource access—point.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for centralized policy management of multiple security domains in accordance with an illustrative embodiment, the method comprising:
   receiving an access request at a microprocessor executing a policy enforcement point component in the data processing system, wherein the policy enforcement point component runs in the data processing system and controls access to a sensitive resource on the data processing system, wherein the policy enforcement point component is managed by a plurality of security domains, and wherein the access request requests access to the sensitive resource;
   sending an access control query from the policy enforcement point component to a policy broker component running in the data processing system;
   responsive to the policy broker component determining no policy decision point component is co-located on the data processing system, sending the access control query to a plurality of policy decision point components associated with the plurality of security domains, receiving independent access decisions from the plurality of policy decision point components, and determining, by the policy broker components, a reconciled access decision that complies with policies of the plurality of security domains based on the independent access decisions received from the plurality of policy decision point components;
   returning, by the policy broker component, the reconciled access decision to the policy enforcement point component; and
   allowing or rejecting, by the microprocessor executing the policy enforcement point component, the access request on the sensitive resource based on the reconciled access decision.

2. The method of claim 1, further comprising:
   responsive to determining a policy decision point component is co-located on the data processing system, selecting the policy decision point component, wherein the selected policy decision point component makes the access decision and receiving the access decision from the policy decision point component.

3. The method of claim 2, wherein the selected policy decision point component registers with a policy administration point component of every other security domain within the plurality of security domains.

4. The method of claim 3, wherein a policy information point component of each other security domain within the plurality of security domains registers with the selected policy decision point component.

5. The method of claim 1, wherein determining the reconciled access decision comprises:
   running a reconciliation algorithm on the independent access decisions to form the reconciled access decision.

6. The method of claim 5, wherein the reconciliation algorithm is a consensus algorithm or a majority algorithm.

7. A computer program product comprising a non-transitory computer readable medium having a computer readable program stored therein, wherein the computer readable program, when executed on a computing device, causes the computing device to:
   receive an access request at a policy enforcement point component in the computing device, wherein the policy enforcement point component runs in the computing device and controls access to a sensitive resource on the computing system, wherein the policy enforcement point component is managed by a plurality of security domains, and wherein the access request requests access to the sensitive resource;
   send an access control query from the policy enforcement point component to a policy broker component running in the computing device;
   responsive to the policy broker component determining no policy decision point component is co-located on the computing device, send the access control query to a plurality of policy decision point component associated with the plurality of security domains, receive independent access decision from the plurality of policy decision point components, and determine, by the policy broker component, a reconciled access decision that complies with policies of the plurality of security domains based on the independent access decisions received from the plurality of policy decision point components;
   return, by the policy broker component, the reconciled access decision to the policy enforcement point component; and
   allow or reject, by the policy enforcement point component, the access request on the sensitive resource based on the reconciled access decision.

8. The computer program product of claim 7, wherein the computer readable program further causes the computing device to:
  responsive to determining a policy decision point component is co-located on the computing device, select the policy decision point component, wherein the selected policy decision point component makes the access decision, and receive the access decision from the policy decision point component.

9. The computer program product of claim 8, wherein the selected policy decision point component registers with a policy administration point component of every other security domain within the plurality of security domains.

10. The computer program product of claim 9, wherein a policy information point component of each other security domain within the plurality of security domains registers with the selected policy decision point component.

11. The computer program product of claim 7, wherein determining the reconciled access decision comprises:
  running a reconciliation algorithm on the independent access decisions to form the reconciled access decision.

12. The computer program product of claim 11, wherein the reconciliation algorithm is a consensus algorithm or a majority algorithm.

13. The computer program product of claim 7, wherein the computing device is mobile computing device.

14. A data processing system, comprising:
  a processor; and
  a memory coupled to the processor, wherein the memory comprises instructions which, when executed by the processor, cause the processor to:
  receive an access request at a policy enforcement point component in the data processing system, wherein the policy enforcement point component runs in the data processing system and controls access to a sensitive resource on the data processing system, wherein the policy enforcement point component is managed by a plurality of security domains, and wherein the access request requests access to the sensitive resource;
  send an access control query from the policy enforcement point component to a policy broker component running in the data processing system;
  responsive to the policy broker determining no policy decision point component is co-located on the data processing system, send the access control query to a plurality of policy decision point components associated with the plurality of security domains, receive independent access decisions from the plurality of policy decision point components, and determine, by the policy broker component, a reconciled access decision that complies with policies of the plurality of security domains based on the independent access decisions received from the plurality of policy decision point components;
  return, by the policy broker component, the reconciled access decision to the policy enforcement point component; and
  allow or reject, by the policy enforcement point component, the access request on the sensitive resource based on the reconciled access decision.

15. The data processing system of claim 14, wherein the instructions further cause the processor to:
  responsive to determining a policy decision point component is co-located on the data processing system, select the policy decision point component, wherein the selected policy decision point component makes the access decision, and receiving the access decision from the policy decision point component.

16. The data processing system of claim 15, wherein the select policy decision point component registers with a policy administration point component of every other security domain within the plurality of security domains.

17. The data processing system of claim 16, wherein a policy information point component of each other security domain within the plurality of security domains registers with the selected policy decision point component.

18. The data processing system of claim 14, wherein determining the reconciled access decision comprises:
  running a reconciliation algorithm on the independent access decisions to for the reconciled access decision.

19. The data processing system of claim 18, wherein the reconciliation algorithm is a consensus algorithm or a majority algorithm.

20. The data processing system of claim 14, wherein the data processing system comprises a mobile computing device.

* * * * *